United States Patent
Brock

[15] 3,693,945
[45] Sept. 26, 1972

[54] ASPHALT PREPARATION PLANT

[72] Inventor: James Donald Brock, Chattanooga, Tenn.

[73] Assignee: CMI Corporation, Oklahoma City, Okla.

[22] Filed: Jan. 20, 1971

[21] Appl. No.: 108,024

Related U.S. Application Data

[63] Continuation-in-part of Ser. No. 41,145, May 25, 1970, Pat. No. 3,614,071.

[52] U.S. Cl. ..................259/146, 259/3, 259/158, 259/168
[51] Int. Cl. ..............................................B28c 5/06
[58] Field of Search......259/145, 146, 147, 148, 151, 259/152, 153, 155, 156, 157, 158, 159, 164, 165, 3

[56] References Cited

UNITED STATES PATENTS

| | | | |
|---|---|---|---|
| 1,240,481 | 9/1917 | Popkess | 259/158 |
| 2,421,345 | 5/1947 | McConnaughay | 259/158 |
| 2,285,765 | 6/1942 | Carswell | 259/165 |
| 3,106,384 | 10/1963 | Preeman | 259/159 R |

*Primary Examiner*—Robert W. Jenkins
*Attorney*—Jones & Thomas

[57] ABSTRACT

An asphalt plant wherein heated air flows through an aggregate dryer and the dust from the aggregate in the dryer is carried in a flow of air from the dryer. The flow of air is subsequently sprayed with bituminous liquid so that dust is combined with the liquid and removed from the flow of air.

22 Claims, 5 Drawing Figures

PATENTED SEP 26 1972

INVENTOR
JAMES DONALD BROCK

BY *Jones & Thomas*
ATTORNEYS

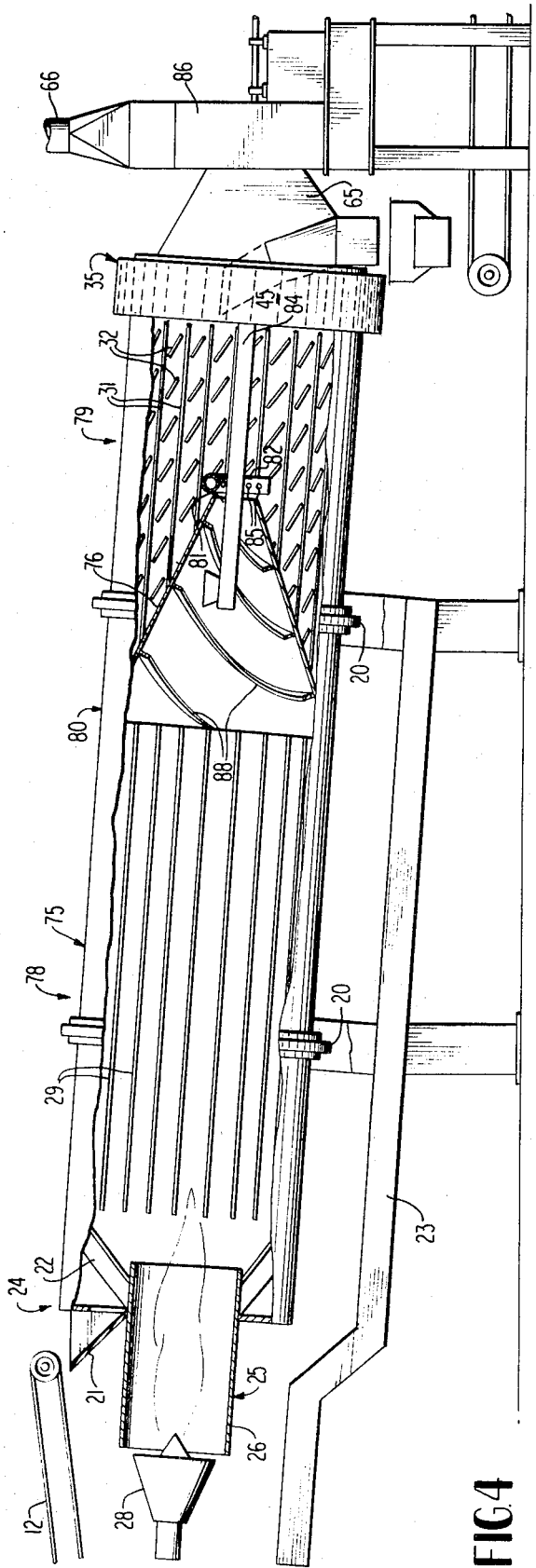
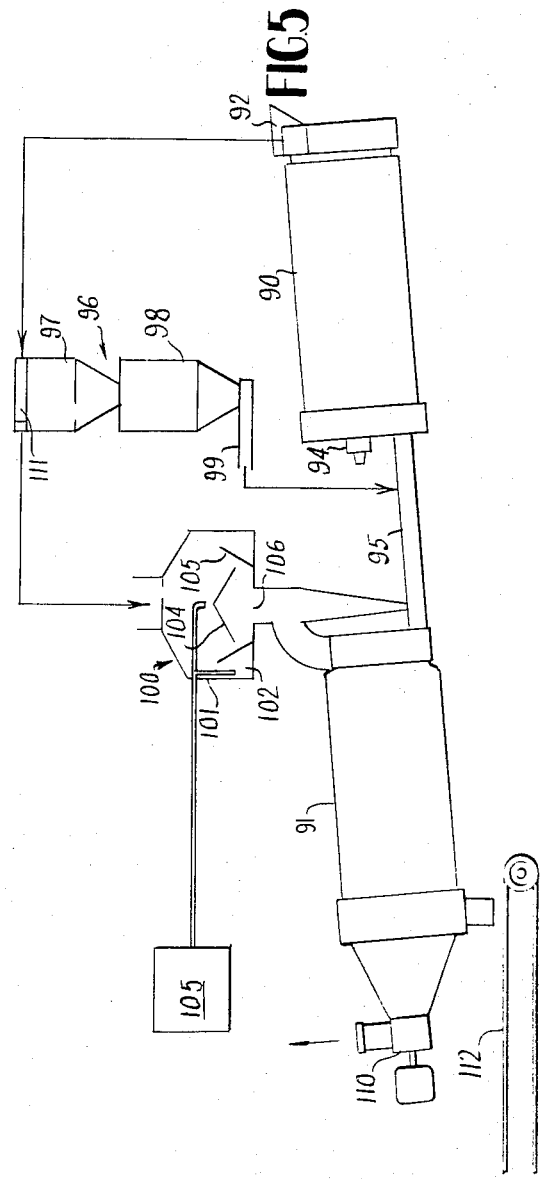

ASPHALT PREPARATION PLANT

CROSS REFERENCE TO RELATED APPLICATION

This application is a continuation-in-part of application, Ser. No. 41,145, filed May 25, 1970, now U.S. Pat. No. 3,614,071.

BACKGROUND OF THE INVENTION

In the preparation of asphalt for road surfaces or the like, it has been customary to dry an aggregate or stone filler in a drying mechanism and mix the dry aggregate with hot bituminous liquid. The aggregate dryer usually comprises an inclined rotatable cylinder which tumbles the aggregate as it passes down the incline of the cylinder, and heated air is passed through the inclined cylinder to heat and dry the aggregate. When the aggregate emerges from the drying apparatus it is usually elevated to a tall structure where it is graded or sized and fed to a pug mill in batches where it is mixed by a plurality of paddles with a bituminous liquid to form the asphaltic mix. The batches of asphalt mix are subsequently fed to an elevated storage silo or dispensed directly to trucks for transporting to a road construction site.

The structure of a typical asphalt mixing plant requires an expensive aggregate grading mechanism and pug mill mechanism at a high elevation so that the aggregate can be graded with the use of gravity and dispensed to the pug mill in a batch. Also, weighing devices for both the aggregate and bituminous liquid, temperature controls, liquid conduits, and other necessary equipment must be a part of the elevated structure in order to dispense the asphalt mix in a downward direction to a truck passing beneath the structure, which causes the structure to be expensive, non-mobile and difficult to manage.

In the process of forming an asphalt mix a large amount of dust and other airborne debris is usually created in the handling of the aggregate, especially at the aggregate dryer where the aggregate is vigorously tumbled and agitated. The dust from the aggregate is usually exhausted from the dryer with the drying air, and a significant portion of the dust is expelled to the atmosphere, as an air pollutant.

SUMMARY OF THE INVENTION

Briefly described, the present invention comprises an asphalt plant which includes a dryer positioned at a low elevation and which functions to dry the aggregate for asphalt mix. A bituminous liquid is added to the aggregate at ground level to form the asphalt mix either in the dryer or in a separate mixing chamber. The mix is subsequently lifted to an elevated surge or storage system, such as an asphalt storage silo, for temporary storage where it can be conveniently dispensed to trucks for transporting to a construction site.

One form of the asphalt plant comprises an inclined rotatable dryer-mixer cylinder arranged to receive aggregate of a predetermined size or mixture of sizes at the upper end or dryer end of the cylinder. A fan communicates with the cylinder and induces a flow of air through the cylinder from its upper end to its lower end. An open flame burner is positioned at the upper end of the cylinder and functions to heat the air and aggregate flowing through the cylinder. A spray mechanism extends into the cylinder from its lower end or mixer end and is arranged to spray the bituminous liquid onto the aggregate passing through the cylinder. The spray mechanism is arranged to form a fine spray or mist across the internal cross-section of the cylinder so that not only the aggregate but any dust or other airborne debris flowing with the air through the cylinder will be coated with the bituminous liquid and fall with the bituminous liquid into the aggregate, so as to become a part of the asphalt mix. By the time the asphalt mix reaches the lower end of the cylinder, it is ready for loading onto a truck for delivery to a construction site or for delivery to a temporary storage container.

In another form of the invention the dryer-mixer is divided into separate dryer and mixer cylinders where the aggregate is first dried in the dryer cylinder and then mixed with the bituminous liquid in the mixer cylinder. A fan is used to flow the dust laden air from the dryer cylinder to the mixer cylinder, and a spray mechanism washes the dust from the air in the mixer cylinder.

Thus, it is an object of this invention to provide an asphalt mixing plant which mixes the dust and other airborne debris from the aggregate dryer with the bituminous liquid so that the dust and other airborne debris are not expelled to the atmosphere.

Another object of this invention is to provide an asphalt plant wherein the aggregate for the asphalt mix is dried and the bituminous liquid is added to the aggregate in a single rotatable cylinder at ground level.

Another object of this invention is to provide a system for continuously forming asphalt mix wherein the hazard of expelling dust to the atmosphere is reduced by combining the dust with the mix.

Another object of this invention is to provide an asphalt plant dryer-mixer that is inexpensive to construct, maintain and operate, which is portable and easy to erect for operation or disassemble for transportation, and which can be utilized with other existing asphalt plant equipment.

Other objects, features and advantages of the present invention will become apparent upon reading the following specification when taken into conjunction with the accompanying drawing.

BRIEF DESCRIPTION OF THE DRAWING

FIG. 4 is a schematic side cross-sectional view of a modified dryer-mixer.

FIG. 5 is a schematic side cross-sectional view of a modified dryer-mixer having separate drying and mixing cylinders.

DESCRIPTION OF THE PREFERRED EMBODIMENTS

Figure 1:
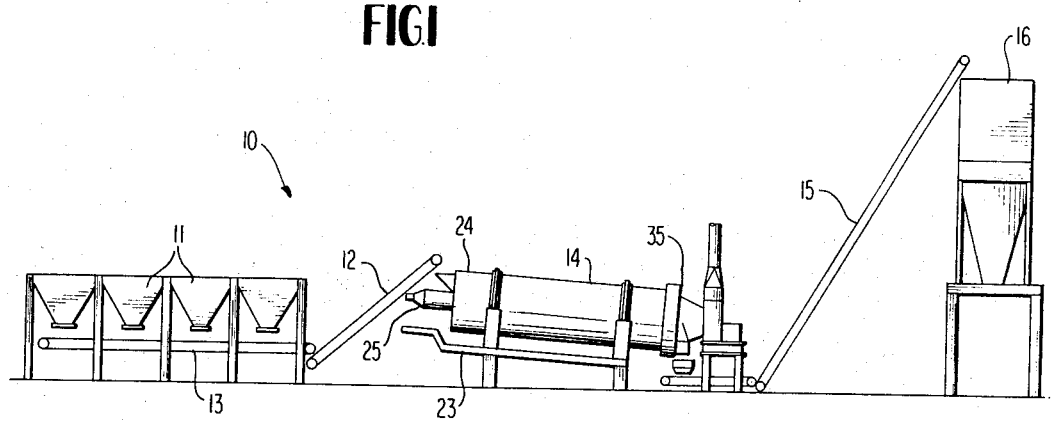
FIG. 1 is a schematic side view of the asphalt plant.

Referring now in more detail to the drawing, in which like numerals indicate like parts throughout the several views, FIG. 1 shows asphalt plant 10 which includes a plurality of aggregate feeder bins 11, conveyor 12, dryer-mixer 14, elevator 15 and surge silo 16. Aggregate feeder bins 11 are filled with sized aggregate, and small conveyors 13 at the bottom of each bin control the flow of aggregate to large conveyor 12. The size of the aggregate being delivered to dryer-mixer 14 is controlled by the outfeed of the various feeder bins 11; that is, when a small aggregate size is desired, the feeder bin having the smaller aggregate particle size will be operated to deposit its aggregate on the conveyor 12. If a mix of small and large aggregate particle size is desired, two or more of the feeder bins 11 can be operated simultaneously to deliver the aggregate to conveyor 12 and the conveyor will function to deliver the aggregate to the dryer-mixer 14.

Figure 2:
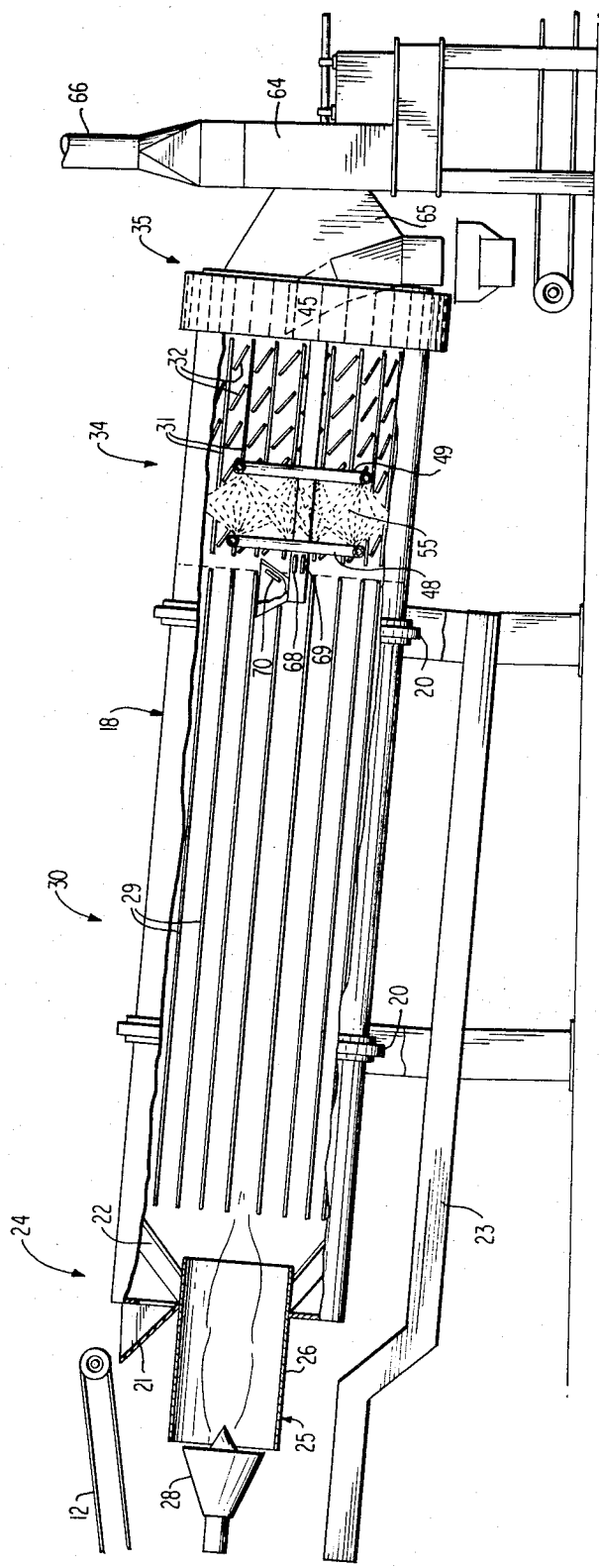
FIG. 2 is a schematic side cross-sectional view of the dryer-mixer

As it best shown in FIG. 2, dryer-mixer 14 comprises an open ended drying and mixing cylinder 18 supported by a plurality of external roller rings 20 on the cylinder. Driving means (not shown) causes the cylinder 18 to rotate on its longitudinal axis.

Cylinder 18 is supported by mobile framework 23. The framework is arranged so that the cylinder 18 can be transported in a substantially horizontal attitude and the framework can be tilted to place cylinder 18 in an inclined attitude. Conveyor 12 functions to deliver the sized aggregate to inlet chute or pan 21 which guides the aggregate down into the cylinder 18. A plurality of inlet vanes 22 are positioned at the upper end or inlet end 24 and are angled with respect to the direction of rotation of cylinder 18 so as to induce the aggregate to flow into the cylinder. Burner 25 includes a cylindrical burner can or shield 26 which is positioned with its longitudinal axis parallel to the longitudinal axis of cylinder 18 and protrudes into the upper end of the cylinder. Burner head 28 is positioned at the outer end of burner can 26 and creates an open flame within the burner can which is directed toward cylinder 18.

While inlet vanes 22 at the upper end of inlet end 24 of the cylinder are arranged to induce the aggregate to enter the cylinder, drying vanes 29 are located in drying zone 30, and the combination of lifting and mixing vanes 31 and 32 are located in mixing zone 34 at the lower or outlet end 35 of cylinder 18. Also, an enlarged diameter lifting ring 36 is connected to the outlet end 35 of cylinder 18 and includes inwardly extending lifting vanes 38. Drying vanes 29 of drying zone 30 and lifting vanes 31 of mixing zone 34 are substantially identical in shape and include elongated channel members (FIG. 3) with inwardly extending webs 39 and inner legs 40 extending from webs 39 in the direction of rotation 41 of cylinder 18. Mixing vanes 32 in mixing zone 34 are angled in the direction of rotation of the cylinder 18 so as to inhibit the flow of the asphalt mix down the incline of cylinder 18 and cause a substantial amount of mixing in mixing zone 34. Lifting vanes 38 of lifting ring 36 are inwardly extending vanes which lift the asphalt mix to a high elevation before dropping the mix into an exhaust chute or hot mix outlet 44 positioned to receive the falling hot mix and guide the hot mix to the entrance of elevator 15.

Figure 3:
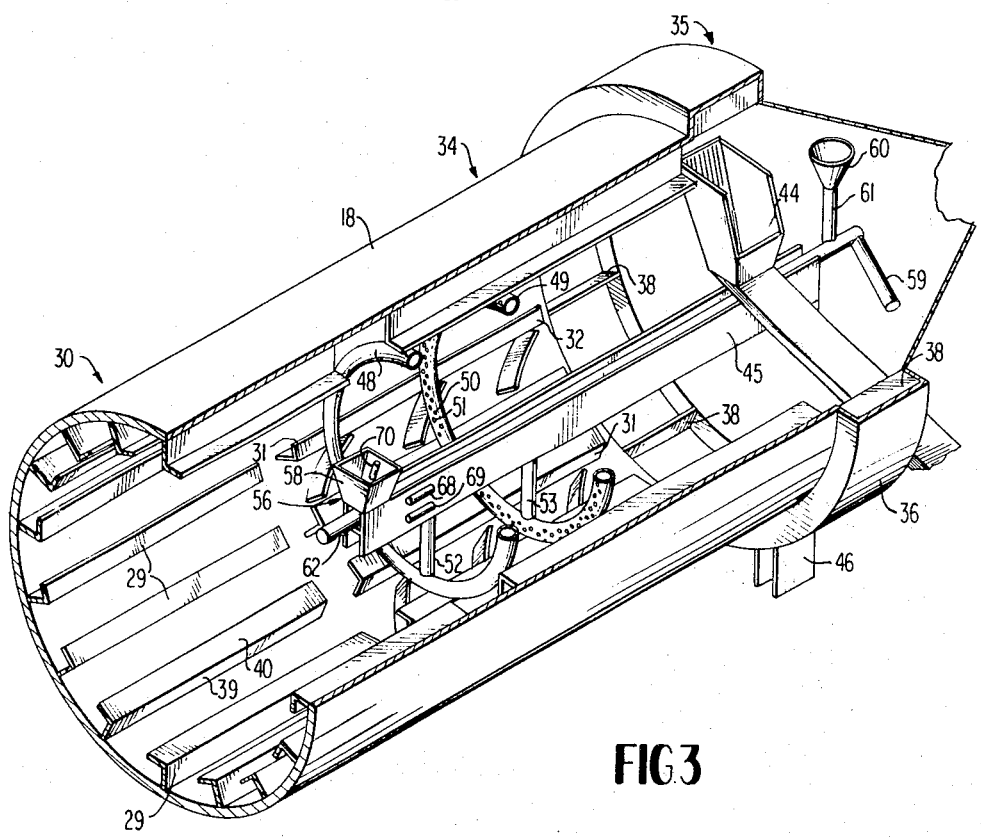
FIG. 3 is a perspective view of the dryer-mixer, with parts broken away to show the inside components.

As illustrated in FIG. 3, a rectilinear support beam 45 which is H-shaped in cross-section extends into cylinder 18 from its lower or outlet end 35. Support beam 45 is supported as a cantilever by upright support beam 46 from outside cylinder 18. H-shaped support beam 45 is oriented so that its center web is horizontal and its end flanges are vertical. A pair of spray rings 48 and 49 are positioned in cylinder 18 at the beginning of mixing zone 34 and surround support beam 45. Spray rings 48 and 49 are annular rings, and each defines a plurality of spaced openings 50 extending generally toward the walls of cylinder 18 and toward the opposite spray ring and the second series of spaced openings 51 extending toward the axis of rotation of the cylinder and toward the opposite spray ring. Connecting pipes 52 and 53 are connected to the lower portions of spray rings 48 and 49 and extend toward the center web of support beam 45. A supply conduit (not shown) communicates with connecting pipes 52 and 53 at their upper ends and is received in and extends along the length of the lower recess of H-shaped support beam 45. The supply conduit extends out the outlet end 35 of cylinder 18 and communicates with a source of supply of hot bituminous liquid (not shown). When the source of supply of hot bituminous liquid communicates with spray rings 48 and 49, the openings 50 and 51 of the spray rings cause a spray or mist 55 to be created within the cylinder 18 of the mixing zone 34, so that virtually the entire cross-sectional area of cylinder 18 in the vicinity of the spray rings is occupied by a spray or mist 55 of hot bituminous liquid.

The upper recess of H-shaped beam 45 is occupied by auger conveyor 56 which extends along the length of the support beam. A sampling hopper 58 communicates with conveyor 56 at the inner end of support beam 45, and discharge chute 59 extends in a downward direction from conveyor 56 at a point beyond the outlet end 35 of cylinder 18. A second hopper 60 is positioned above conveyor 56 beyond the outlet end 35 of cylinder 18 and its inclined conduit 61 communicates with conveyor 56 so that material can be fed to the conveyor from outside cylinder 18. Discharge opening 62 is positioned within cylinder 18 at the inner end of support beam 45. With this arrangement, the auger (not shown) of conveyor 56 can be rotated in one direction to flow material from sampling hopper 58 along the length of the conveyor to the discharge chute 59, or the auger can be rotated in the opposite direction to flow material from hopper 60 and conduit 61 along the length of the conveyor to discharge opening 62.

Exhaust blower 64 is mounted on mobile frame 23 and includes a hood or breeching 65 which registers with the outlet or lower end 35 of cylinder 18 and exhaust stack 66 which extends in an upward direction. The arrangement is such that blower 64 induces a flow of air through dryer-mixer 14, from the upper or inlet end 24 to the lower or outlet end 35. Hot mix exhaust chute 44 extends through hood 65 and is angled inwardly toward the upper portion of lifting ring 36 to receive the falling mix. Also, the upright beam 46 extends through hood 65 and is connected to other supporting framework (not shown) to maintain support beam 45 within cylinder 18. The sloped conduits 59 and 61 of conveyor 56 also extend through hood 65.

Elevator 15 is a drag conveyor and functions to convey the asphalt mix from hot mix exhaust chute 44 of dryer-mixer 14 to the upper end of surge silo 16.

As is illustrated in FIG. 3, a pair of temperature probes 68 and 69 are mounted within cylinder 18 at a position upstream of spray rings 48 and 49. Temperature probe 68 is a quick response or fast acting temperature sensor, while temperature probe 69 is slower to respond to temperature changes. Temperature probes 68 and 69 are arranged to sense or determine the air temperature within cylinder 18. A third temperature probe 70 is positioned so as to be in contact with the aggregate within cylinder 18 as the aggregate leaves drying zone 30 and enters mixing zone 34. In the specified embodiment shown, aggregate temperature probe 70 is located on an inner wall of sampling hopper 58.

Temperature probes 68, 69 and 70 are electrically connected to a control mechanism (not shown) to regulate burner 25 and conveyors 12 and 13, to control the intensity of the flame of burner 25 and the rate of infeed of aggregate from feeder bins 11. The temperature probes generally separate the drying zone 30 from the mixing zone 34 so that under ideal conditions the aggregate flowing through drying zone 30 will be at the right temperature level and will be completely dry and will accept the application of bituminous liquid when it reaches the end of drying zone 30. If the aggregate is properly prepared long before reaching the end of drying zone 30, the burner flame is too intense and asphalt plant 10 will not be operating at optimum efficiency, or if the aggregate has not been dried or has not reached the proper temperature level before it enters mixing zone 34, the bituminous liquid will not cling to the aggregate or will tend to strip off the aggregate.

As is illustrated in FIG. 4., a modified dryer cylinder 75 is shown which includes conical insert 76 positioned at the end of drying zone 78 generally between drying zone 78 and mixing zone 79. Conical insert 76 is connected to the inside surfaces of cylinder 80 and forms a funnel shape with an opening 81 which projects into mixing zone 79 and which is of smaller cross sectional area than the inside cross sectional area of cylinder 79. An inverted U-shaped spray nozzle 82 is supported by the H-shaped support beam 84 immediately down stream from opening 81 in conical insert 76. The plurality of nozzle openings 85 are directed generally inwardly of the opening of the inverted U-shape nozzle 82, and the opening of the nozzle generally surrounds the air flow stream directed through conical insert 76 by fan 86. Conical insert 76 rotates with cylinder 79 and the spiral feed vanes 88 are attached to the inside surface of conical insert 76 and function to feed the aggregate toward opening 81. Thus, both the aggregate and the dust laden air from drying zone 78 will pass through opening 81 in the vicinity of the spray formed by U-shaped nozzle 82. Of course, the aggregate will tend to fall to the lower portion of mixing zone 79 of the cylinder 80 while the flowing dust and air will tend to pass laterally on through mixing zone 79, except for the turbulance of the aggregate and the air in the mixing zone. The spray from U-shaped nozzle 82 tends to wash down the flowing air and catch the dust in the air, so that a major portion of the dust passing with the air through opening 81 is coated with the bituminous liquid and falls with the bituminous liquid to the lower portion of the mixing zone with the aggregate. The remaining elements of the modified mixer cylinder of FIG. 4 are generally similar to the mixer cylinders shown in FIGS. 1–3.

As is illustrated in FIG. 5, the dryer mixer is separated into drying cylinder 90 and mixing cylinder 91. Aggregate is fed to drying cylinder 90 through chute 92 and the internal vanes (not shown) of the rotatable drying cylinder 90 cause the aggregate to tumble down the length of the drying cylinder as the aggregate progresses down the incline of the drying cylinder. The air within the drying cylinder is heated by heater 94 as the aggregate moves through the drying cylinder and the aggregate leaves the drying cylinder through exhaust chute 95 where it is fed to mixing cylinder 91.

Separator 96 communicates with the upper end of drying cylinder 90 and includes a centrifuge separator 97 and a lower storage silo 98. Auger conveyor 99 communicates with the lower end of storage silo 98 and functions to deliver dust from the storage silo 98 to exhaust chute 95.

Air washer 100 includes a container 101 open at its upper and lower ends. Container 101 includes a hot bituminous liquid sump 102 and an air and liquid baffle 104. Hot bituminous liquid flows from source 105 to container 101 where the flow is divided to deliver liquid to sump 102 and to baffle 104. The inner wall 105 of sump 102 is inclined inwardly toward the lower outlet 106 of container 101 and functions as a wier or flow surface for the hot bituminous liquid. Baffle 104 is downwardly inclined and washed with the hot bituminous liquid from source 105. The lower opening 106 of air washer 100 communicates both with exhaust chute 95 from drying cylinder 90 and with mixing cylinder 91.

The air flow through the system is induced by fan 110 at the lower end of mixing cylinder 91 and fan 111 of centrifuge separator 97. Air flows generally through heater 94 into the lower end of drying cylinder 90, up through the upper end of drying cylinder 90, then through centrifuge separator 97, then into the upper end of air washer 100, then from the lower end of air washer 100 into the upper end of mixing cylinder 91, then from the lower end of mixing cylinder 91 through fan 110 to the atmosphere. The arrangement is such that the dust from the aggregate in drying cylinder 90 flows to centrifuge separator 97. The heavier dust is retained in centrifuge separator 97 and allowed to flow into storage silo 98. The air and the lighter dust then flows from centrifuge separator 97 into the upper end of air washer 100. The dust and air impinge upon baffle 104 and inner wall 105 of the air washer 100, and the hot bituminous liquid flowing over baffle 104 and inner wall 105 tends to receive and hold the dust. The substantially dust free air then flows from the lower opening of air washer 100 into mixing cylinder 91, and then out of the lower end of the mixing cylinder.

In the meantime, the heavier dust particles retained in separator 96 are stored in storage silo 98 and progressively added back to the aggregate passing from drying cylinder 90 toward mixing cylinder 91. As the aggregate moves through exhaust chute 95, the hot bituminous liquid flowing from the lower end of the air washer 100 coats the aggregate and the heavier dust prior to entering mixing cylinder 91. The liquid coating prevents the dust from becoming airborne again in mixing cylinder 91.

The lighter dust that passes from separator 96 impinges upon baffle 104 and inner wall 105 and becomes imbedded in the hot bituminous liquid passing over these surfaces. When the bituminous liquid passes from the lower end of air washer 100, substantially all of the airborne dust entering air washer 100 is trapped in the liquid and passes with the liquid into exhaust chute 95. Thus, substantially all of the air entering the upper end of the mixing cylinder 91 is virtually dust free, and substantially all of the aggregate passing through exhaust chute 95 toward mixing cylinder 91 becomes dust free as it is drenched with the bituminous liquid from air washer 100.

The aggregate, dust and bituminous liquid mixture entering mixing cylinder 91 is thoroughly mixed in and eventually exhausted from mixing cylinder 91 onto a conveyor 112 where it is transported to a storage silo or to a truck etc. When the heavier dust is separated from the air flow separator 96, the dust can be retained in storage silo 98 or it can be conveyed from the storage silo into exhaust chute 95. Auger conveyor 99 thus functions as a control means to control the amount of dust received in mixing cylinder 91. In some instances, the aggregate will carry more dust than would be desirable, so that the speed of operation of the auger conveyor 99 can be slowed or stopped and the quality of aggregate conveyed through exhaust chute 95 to mixing cylinder 91 will carry substantially less dust. By contrast, if the aggregate received in drying cylinder 90 does not carry enough dust, auger conveyor 99 can be adjusted to convey more dust from storage silo 98 to provide the proper dust-aggregate mixture for mixing cylinder 91. If necessary, additional dust can be added to storage silo 98.

OPERATION

When dryer-mixer 14 of FIGS. 1-3 is to be connected to an asphalt plant, its mobile frame 23 is placed in position and tilted to incline cylinder 18. The degree of incline of the cylinder generally controls the speed with which the aggregate will travel through the dryer-mixer for a given rotational speed of the cylinder. Under normal circumstances, the cylinder 18 will be inclined at an angle of between 2 ½ and 7 degrees from the horizontal, which is sufficient to move the aggregate from the upper inlet end to the lower outlet end, and to retain the aggregate within the cylinder for the length of time sufficient to properly dry the aggregate in drying zone 30 before it reaches the mixing zone 34.

When the operation of the plant is begun the sized aggregate is fed from feeder bins 11 on conveyors 12 and 13 to inlet chute 21, where the aggregate first enters the inlet end 24 of cylinder 18. When the aggregate engages inlet vanes 22, it is urged on into drying zone 30 beyond the burner can 26 of burner 25. Burner 25 creates an open flame that is surrounded by burner can 26 and provides intense heat inside cylinder 18 in drying zone 30. Exhaust blower 64 induces a flow of air from inlet end 24 of the cylinder to the lower outlet end 35, through hood 65 and up exhaust stack 66. This tends to confine the heat from burner 25 primarily within cylinder 18.

Spray rings 49 and 50 within cylinder 18 function to flow bituminous liquid into mixing zone 34 at a high velocity so that a fine spray or mist 55 is created across the entire cross-section of cylinder 18 in the vicinity of the spray rings. Since openings 50 and 51 of spray rings 49 and 50 extend both inwardly and outwardly of the spray rings there will be virtually no open space in the vicinity of the spray rings that is not occupied with a spray of bituminous liquid. Moreover, as the spray disperses within mixing zone 34, it settles within mixing zone 34 as it moves with the flow of air through the cylinder toward outlet end 35.

As the aggregate first enters cylinder 18 and subsequently passes through drying zone 30, it is vigorously tumbled and mixed within the drying zone and a large amount of dust and other airborne debris is created. Since all of the dust must pass through mixing zone 34, it is virtually all coated with bituminous liquid from spray rings 49 and 50, which causes substantially all of the dust to be coated with the bituminous liquid and fall to the mass of aggregate flowing along cylinder 18. Also, as the aggregate passes through cylinder 34, each aggregate particle has its entire surface exposed to the bituminous liquid so as to be completely coated with the bituminous liquid due to the tumbling within the cylinder, engagement with the inner walls of the cylinder which are continuously coated with the bituminous liquid, and by repeated and rapid engagement with other previously coated aggregate particles. By the time the aggregate reaches lifting ring 36 at the lower outlet end of cylinder 18, each aggregate particle is properly coated with the bituminous liquid. Moreover, the airborne dust from the drying zone 30 will have been drawn into the bituminous mist so that it settles into the aggregate and becomes a part of the asphalt mix. Thus, the airborne dust is actually combined with the asphalt mix.

In order to positively control the quality of the asphalt mix obtained from dryer-mixer 14, temperature probes 68 and 69 sense the temperature of the air in cylinder 18 and regulate the intensity of the flame from burner 25, and the speed of operation of conveyors 12 and 13. Temperature probe 70 determines the temperature of the aggregate at the end of drying zone 30 and also functions to regulate the burner and conveyors. Thus, optimum efficiency of the drying zone 30 can be achieved for various atmospheric and aggregate conditions.

In order to sample the gradation of the aggregate at the end of drying zone 30, auger conveyor can be operated to retrieve aggregate samples as desired, so that fine adjustments can be made to the system in response to actually handling the aggregate samples. Of course, after the dryer-mixer has been initially adjusted to provide the proper asphalt mix consistency, the operation of auger conveyor 56 can be terminated if desired since the operating conditions of the dryer-mixer are not likely to vary to any substantial extent after the operation thereof has been initiated. Moreover, auger conveyor 56 can be reversed so that a mineral filler or other additive can be delivered to the aggregate at the end of drying zone 30.

The embodiment of the invention illustrated in FIG. 4 functions in a manner similar to the embodiment of FIGS. 1-3, except that the dust laden air from the aggregate in the drying zone is channeled through the conical insert 76, and the nozzle 82 functions to spray the bituminous liquid in a more concentrated area. The spray will generally be in a downward direction and generally across the flow of air. The aggregate tends to tumble out of the end of the opening 81 of the conical insert, and the bituminous liquid will generally contact the aggregate as it emerges from the conical insert and a portion of the bituminous liquid will tend to fall to the lower portion of the mixing zone with the aggregate and coat the aggregate. Of course, as the aggregate is tumbled in the mixing zone, it becomes completely coated with the bituminous liquid, as previously described.

The nozzle arrangement of the embodiment illustrated in FIG. 4 is less apt to be clogged with smaller particles of aggregate, debris, etc. since dust and air flowing through the restricted opening 81 generally is confined to the opening of the nozzle and moves through and beyond the nozzle.

The operation of the form of the invention illustrated in FIG. 5 is generally similar to the operation previously described except that the heavier dust particles are physically separated from the flow of air in separator 96 and recombined at a selected rate in mixer cylinder 91. More dust can be added to the mix by adding dust from storage silo 98 or the quantity of the heavier dust from the aggregate can be reduced by slowing or stopping the rotation of the auger of conveyor 99. When the heavier dust enters exhaust chute 95 it is coated with the bituminous liquid from air washer 100 and the dust does not tend to become air-borne again. The arrangement of FIG. 5 is desirable in situations where the aggregate used to form the mix has a lot of dust in it and it is desired to remove some of the dust, or where the aggregate is relatively clean and it is desirable to add dust to the mix. The quality of the mix can be positively controlled even when improper aggregate is available.

Since the operation of the three dryer-mixers is of a continuous nature as opposed to the batch pug mill system, the operation of the dryer-mixers will usually be a continuous operation; that is, a flow of aggregate from feeder bins 11 will be initiated and continue and the other components of the system will be initiated and will be allowed to continue until one or more of the surge silos have been completely filled or until the source of aggregate from the feeder bins has been depleted. With this arrangement, the consistency of the asphalt produced by the system can be closely inspected as the operation of the system is initiated, and the system can continue to operate with only a token amount of attention and the consistency of the asphalt produced is prone to remain constant.

It will be noted that the air drawn into the inlet ends of the dryer cylinders is used to support the combustion taking place in the burners, so that the gases flowing through cylinders are generally inert. This results in low oxidation of the asphalt mix in the mixing zones and "softer" mix is created and delivered to the storage silo 16. The softer asphalt mix has good compacting characteristics which enables the contractor to form a high quality road surface with the mix.

While this invention has been described in detail with particular reference to preferred embodiments thereof, it will be understood that variations and modifications can be effected within the spirit and scope of the invention as described hereinbefore and as defined in the appended claims.

I claim:

1. In a plant for forming asphalt mix or the like including an aggregate dryer for drying aggregate and a mixer for mixing a bituminous liquid with the aggregate, the combination therewith of air flow means for inducing a flow of air from the aggregate dryer through the mixer, a dust collector positioned in the air flow means for collecting heavy dust particles from the air flow, and spray means for forming a bituminous mist in said mixer in the air flow.

2. The invention of claim 1 and further including means for combining the heavy dust from the dust collector with the aggregate.

3. Apparatus for making an asphalt mix comprising a mixing cylinder positioned with its longitudinal axis at an incline and having an upper end and a lower end, means for rotating said mixing cylinder about its longitudinal axis, aggregate feed means positioned at the upper end of said mixing cylinder for feeding aggregate to said mixing cylinder, heating means positioned at the upper end of said mixing cylinder for heating the aggregate fed to said mixing cylinder, an aggregate and air flow constricting means for forming an opening of smaller cross-sectional area than said mixing cylinder positioned intermediate the ends of said mixing cylinder, air flow means arranged to create a flow of air through said mixing cylinder from the upper end toward and out of the lower end at a velocity sufficient to cause at least some aggregate in said mixing cylinder to become airborne in said flow of air and pass in said flow of air through said opening, bituminous spray means for spraying bituminous liquid into said flow of air in said mixing cylinder at a position down stream from said opening.

4. The apparatus of claim 3 and wherein said aggregate feed means comprises a plurality of aggregate storage bins for storing and dispensing sized aggregates, and conveyor means extending between said aggregate storage bins and the upper end of said mixing cylinder.

5. The apparatus of claim 3 and wherein said air flow means is positioned at the lower end of said mixing cylinder and arranged to draw air through said mixing cylinder.

6. The apparatus of claim 3 and wherein said heating means comprises an open flame burner arranged to project a flame toward the lower end of said mixing cylinder.

7. The apparatus of claim 3 and wherein said bituminous spray means comprises a plurality of nozzle openings positioned within said mixing cylinder and arranged to spray bituminous liquid into said flow of air passing through said opening.

8. The apparatus of claim 3 and wherein said bituminous spray means comprises a plurality of spray nozzles positioned with in said mixing cylinder and supported from outside said mixing cylinder.

9. A process of preparing asphalt mix or the like comprising drying a mass of aggregate, flowing air through the aggregate as the aggregate is dried and carrying dust from the aggregate with the air to a separator, separating heavier dust from the flowing air, washing the air and lighter dust with a bituminous liquid, combining the lighter dust and bituminous liquid with the dried aggregate, mixing the combined lighter dust, bituminous liquid and dried aggregate, and adding selected amounts of the heavier dust to the mixture.

10. The process of claim 9 and wherein the step of adding selected amounts of the heavier dust to the mixing chamber comprises applying bituminous liquid to the heavier dust prior to adding the heavier dust to the mixture.

11. In a process of making asphalt mix wherein aggregate is dried and a bituminous liquid is mixed with the aggregate, the step of combining the dust from the aggregate and the bituminous liquid and mixing the dust-liquid with the aggregate.

12. The process of claim 11 and wherein the step of combining the dust from the aggregate and the bituminous liquid comprises flowing the dust in a stream of air and spraying the bituminous liquid into the dust laden stream of air.

13. A method of preparing an asphalt mix or the like comprising flowing a stream of heated air through dust laden aggregate to dry the aggregate and remove the dust from the aggregate, spraying the stream of heated air with a bituminous liquid to coat the dust with bituminous liquid and remove the dust from the stream of air, and combining the dust carrying bituminous liquid with the aggregate.

14. A method of preparing an asphalt mix comprising tumbling dust laden aggregate in a drying chamber, flowing a stream of heated air through the drying chamber to dry the aggregate and remove the dust from the aggregate, flowing a spray of bituminous liquid through the stream of air to coat the dust in the stream of air with bituminous liquid, and combining the dust carrying bituminous liquid with the aggregate.

15. In a plant for forming an asphalt mix from aggregate and a bituminous liquid, drying means for drying said aggregate; fan means for creating a flow of air through and out of said drying means of sufficient velocity to cause some of said aggregate to separate from the rest of said aggregate and become airborne in said flow of air; entrapping means for removing at least a portion of said some of said aggregate from said flow of air by entrapping said portion in a bituminous liquid; and mixing means for mixing said bituminous liquid having said portion entrapped therein with said rest of said aggregate.

16. The plant of claim 15 in which said mixing means mixes a predetermined quantity of said bituminous liquid having said portion entrapped therein with said rest of said aggregate.

17. The plant of claim 15 in which said entrapping means is a spray means arranged to spray bituminous liquid into said flow of air.

18. The plant of claim 17 in which said spray means comprises an inverted U-shaped nozzle having nozzle openings directed generally inwardly across the space bounded by said nozzle.

19. In a plant for forming an asphalt mix from aggregate and a bituminous liquid, drying means for drying said aggregate; air flow means for creating a flow of air through and out of said drying means of sufficient velocity to cause some of said aggregate to separate from the rest of said aggregate and become airborne in said flow of air; and entrapping means for removing at least a portion of said some of said aggregate from said flow of air by entrapping said portion in a bituminous liquid.

20. In a plant for forming an asphalt mix from aggregate and a bituminous liquid, drying means for drying said aggregate; air flow means for creating a flow of air through and out of said drying means of sufficient velocity to cause dust in said drying means to become airborne and pass from said drying means in said flow of air; and entrapping means for removing at least a portion of said dust from said flow of air by entrapping said dust in a bituminous liquid.

21. In a plant for forming an asphalt mix from aggregate and a bituminous liquid, drying means for drying said aggregate by a flow of air of sufficient velocity to cause some of said aggregate to separate from the rest of said aggregate and become airborne in said flow of air; constricting means for constricting said flow of air to increase the concentration of said some of said aggregate and thereby provide a relatively concentrated aggregate in said flow of air; entrapping means for removing at least a portion of said concentrated aggregate from said flow of air by entrapping said portion in a bituminous liquid; and mixing means for mixing said bituminous liquid having said portion entrapped therein with said rest of said aggregate.

22. In a plant for forming an asphalt mix from aggregate and a bituminous liquid, drying means for drying said aggregate by a flow of air of sufficient velocity to cause some of said aggregate to separate from the rest of said aggregate and become airborne in said flow of air, said some of said aggregate including light particles and heavy particles heavier than said light particles; first entrapping means for separating at least a portion of said light particles from at least a portion of said heavy particles by removing said portion of said heavy particles from a flow of air; second entrapping means for removing at least a portion of said light particles from a flow of air by entrapping said light particles in a bituminous liquid; and mixing means for mixing said bituminous liquid having light particles entrapped therein with said rest of said aggregate.

* * * * *